(12) United States Patent
Matsuno et al.

(10) Patent No.: US 12,549,865 B2
(45) Date of Patent: Feb. 10, 2026

(54) IMAGE CAPTURING APPARATUS AND METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Keisuke Matsuno, Kanagawa (JP); Jun Watanabe, Kanagawa (JP); Kohei Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 18/168,880

(22) Filed: Feb. 14, 2023

(65) Prior Publication Data
US 2023/0269495 A1     Aug. 24, 2023

(30) Foreign Application Priority Data
Feb. 21, 2022   (JP) ................... 2022-024918

(51) Int. Cl.
*H04N 23/84*   (2023.01)
*G06T 7/90*    (2017.01)
(Continued)

(52) U.S. Cl.
CPC ............ *H04N 23/84* (2023.01); *G06T 7/90* (2017.01); *H04N 23/632* (2023.01); *H04N 23/64* (2023.01); *G06T 2207/10024* (2013.01)

(58) Field of Classification Search
CPC ...... H04N 23/84; H04N 23/632; H04N 23/64; H04N 23/667; H04N 23/6812;
(Continued)

(56) References Cited

U.S. PATENT DOCUMENTS

2015/0103187 A1*  4/2015  Schieltz ............... H04N 5/77
                                                    348/187
2016/0037046 A1*  2/2016  Nashizawa ........... H04N 23/84
                                                    348/229.1
(Continued)

FOREIGN PATENT DOCUMENTS

JP       220304679 A    2/2003
JP       2004112694 A   4/2004
(Continued)

*Primary Examiner* — Kelly L Jerabek
(74) *Attorney, Agent, or Firm* — Cowan, Liebowitz & Latman, P.C.

(57) ABSTRACT

This inventions provides an image capturing apparatus capable of obtaining an image corrected so as to have an image quality preference of a user by changing the degree of application of the 3D-LUT using only a single LUT processing circuit. To this, the image capturing apparatus that includes an image capturing unit, comprises an acquisition unit that acquires a first look-up table for converting image data, a setting unit that sets a degree of application of the first look-up table acquired by the acquisition unit, and a generation unit that generates a second look-up table from the first look-up table based on the degree of application set by the setting unit, wherein image data obtained by the image capturing unit is converted using the second look-up table generated by the generation unit.

9 Claims, 8 Drawing Sheets

(51) Int. Cl.
*H04N 23/60* (2023.01)
*H04N 23/63* (2023.01)

(58) Field of Classification Search
CPC ...... H04N 23/687; H04N 23/85; H04N 23/75; G06T 7/90; G06T 2207/10024
See application file for complete search history.

(56) References Cited

U.S. PATENT DOCUMENTS

| | | | |
|---|---|---|---|
| 2019/0379848 A1* | 12/2019 | Berkovich | H04N 25/78 |
| 2020/0043441 A1* | 2/2020 | Kim | G09G 3/3607 |
| 2020/0077069 A1* | 3/2020 | Morotomi | H04N 19/146 |
| 2021/0297621 A1* | 9/2021 | Shirai | H04N 25/61 |
| 2023/0217098 A1* | 7/2023 | Wang | H04N 23/633 |
| | | | 348/333.02 |
| 2024/0007599 A1* | 1/2024 | Maita | G06V 10/56 |
| 2025/0080862 A1* | 3/2025 | Xiao | H04N 23/632 |

FOREIGN PATENT DOCUMENTS

| | | | |
|---|---|---|---|
| JP | 2005311544 A | 11/2005 | |
| JP | 2006042294 A | 2/2006 | |
| JP | 2007221606 A | 8/2007 | |
| JP | 2007300204 A | 11/2007 | |
| JP | 2012-165147 A | 8/2012 | |
| JP | 2020038505 A | 3/2020 | |
| WO | 2008111476 A | 9/2008 | |

\* cited by examiner

```
START
  ↓
ACQUIRE 3D-LUT — S401
  ↓
ACQUIRE DEGREE OF APPLICATION — S402
  ↓
GENERATE 3D-LUT DATA IN ACCORDANCE
WITH DEGREE OF APPLICATION — S403
  ↓
CONVERT IMAGE BASED ON 3D-LUT — S404
  ↓
END
```

| R | G | B |
|---|---|---|
| 0 | 0 | 0 |
| 0 | 0 | 0 |
| 0.0092 | 0.0092 | 0.0092 |
| ⋮ | ⋮ | ⋮ |
| 1 | 0.6115 | 0.5469 |
| 1 | 0.7563 | 0.6945 |
| 0.0017 | 0.4670 | 0.0923 |
| ⋮ | ⋮ | ⋮ |
| 0.8464 | 1 | 0.8080 |
| 0.8618 | 1 | 0.8253 |
| 0.8876 | 1 | 0.8545 |
| ⋮ | ⋮ | ⋮ |

FIG. 5B

| R | G | B |
|---|---|---|
| 0 | 0 | 0 |
| 0.0625 | 0 | 0 |
| 0.125 | 0 | 0 |
| ⋮ | ⋮ | ⋮ |
| 0.9375 | 0.375 | 0.1875 |
| 1 | 0.375 | 0.1875 |
| 0 | 0.4375 | 0.1875 |
| ⋮ | ⋮ | ⋮ |
| 0.25 | 0.875 | 0.625 |
| 0.3125 | 0.875 | 0.625 |
| 0.375 | 0.875 | 0.625 |
| ⋮ | ⋮ | ⋮ |

FIG. 5C

| R | G | B |
|---|---|---|
| 0 | 0 | 0 |
| 0.0125 | 0 | 0 |
| 0.0324 | 0.0074 | 0.0074 |
| ⋮ | ⋮ | ⋮ |
| 0.9875 | 0.5642 | 0.475 |
| 1 | 0.68 | 0.5931 |
| 0.0014 | 0.4611 | 0.1113 |
| ⋮ | ⋮ | ⋮ |
| 0.7271 | 0.975 | 0.7714 |
| 0.7519 | 0.975 | 0.7852 |
| 0.7851 | 0.975 | 0.8086 |
| ⋮ | ⋮ | ⋮ |

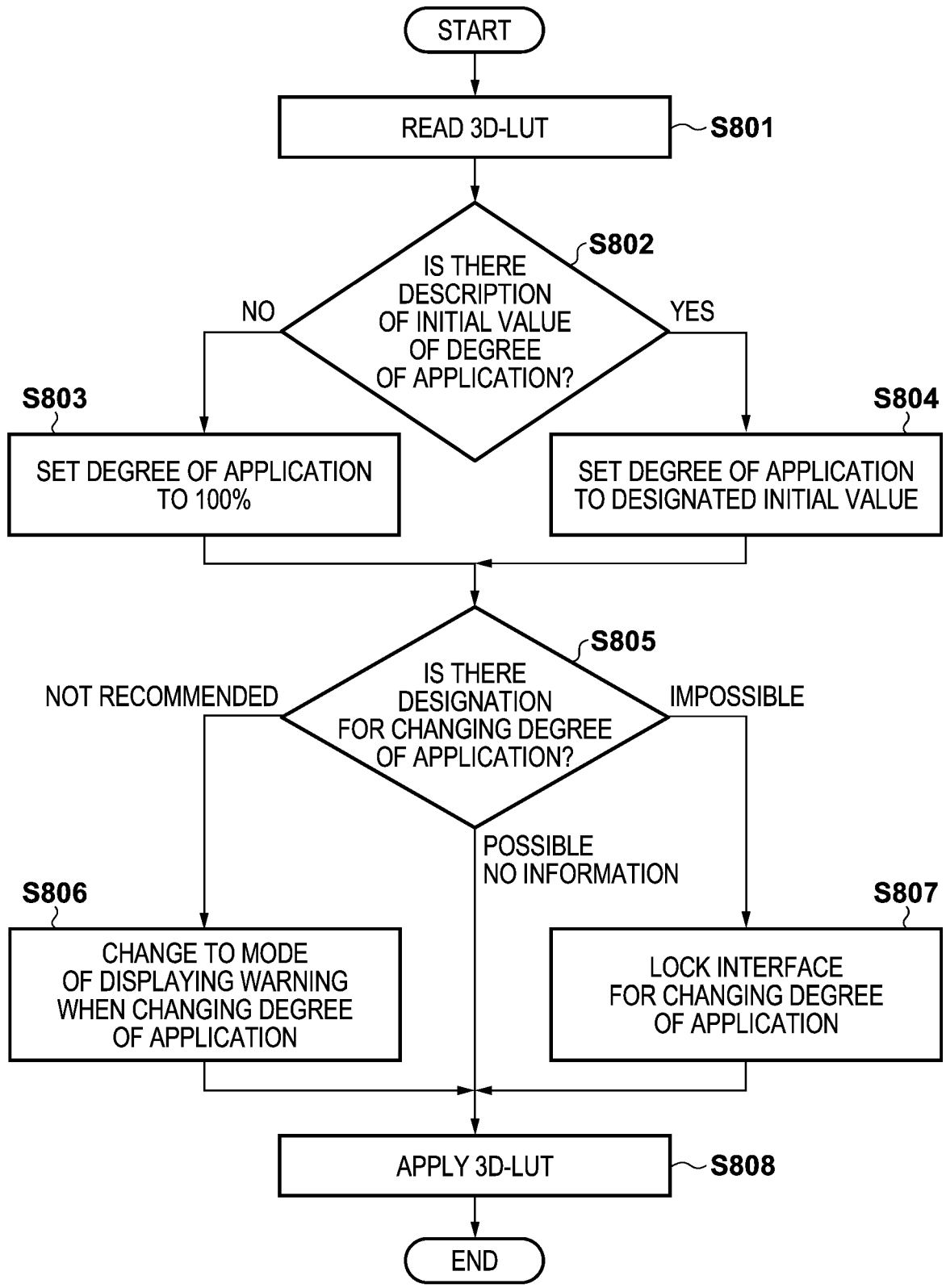

```
3DLUT_SIZE 17

#CHANGE IN DEGREE
 OF APPLICATION NOT ALLOWED 0.00000000   0.00000000   0.00000000
0.00000000   0.00000000   0.00000000
0.01308839   0.01308839   0.01308839
0.06596362   0.01088667   0.01450984
0.15752903   0.01362937   0.02342073
0.27526456   0.01014529   0.03133833
0.41192915   0.00465109   0.04227814
    ⋮             ⋮             ⋮
```

```
3DLUT_SIZE 17

#CHANGE IN DEGREE
 OF APPLICATION IS NOT
 RECOMMENDED
# INITIAL VALUE OF DEGREE
 OF APPLICATION IS 0.8

0.00000000   0.00000000   0.00000000
0.00000000   0.00000000   0.00000000
0.01308839   0.01308839   0.01308839
0.06596362   0.01088667   0.01450984
0.15752903   0.01362937   0.02342073
0.27526456   0.01014529   0.03133833
0.41192915   0.00465109   0.04227814
    ⋮             ⋮             ⋮
```

IMAGE CAPTURING APPARATUS AND METHOD FOR CONTROLLING THE SAME, AND NON-TRANSITORY COMPUTER-READABLE STORAGE MEDIUM

BACKGROUND OF THE INVENTION

Field of the Invention

The present invention relates to an image capturing apparatus, a method for controlling the same, and a computer-readable storage medium.

Description of the Related Art

A three-dimensional look-up table (hereinafter, a 3D-LUT) is generally used as means for correcting a color and a contrast of an image. Many image capturing apparatuses can convert images based on the 3D-LUTs built in the image capturing apparatuses or can retrieve the 3D-LUTs generated by, for instance, external applications and convert images.

In addition, for instance, a 3D-LUT for conversion into a cinema-like image and a 3D-LUT aiming at a special effect are often provided on, for instance, the Web for a charge or for free. Therefore, a user can obtain a favorite 3D-LUT and convert an image.

However, the 3D-LUT provided on, for instance, the Web is a 3D-LUT for conversion into an image that a creator of the 3D-LUT thinks is good, and the image thereof is not necessarily what all people think is good. Some people may desire to perform the conversion with a reduced effect. In such a case, it is necessary to perform processing that first shoots an image without conversion with a 3D-LUT and then combines, in post-production, the image as shot with an image converted with the 3D-LUT, which requires a lot of effort.

As means for changing a degree of change in an image with a 3D-LUT, for instance, the literature: Japanese Patent Laid-Open No. 2012-165147 discloses a technology of detecting scenes and combining correction tables for each of the scenes in accordance with reliability of a plurality of candidate scenes.

In the above literature, the correction table changes according to the determined scene, but the degree of correction is a level recognized as appropriate by a camera and does not always match a preference of a user. Further, even when the degree of correction is different from the preference of the user, it is difficult for the user to change it in accordance with their preference.

SUMMARY OF THE INVENTION

According to an aspect of the invention, there is provided an image capturing apparatus that includes an image capturing unit, comprising: an acquisition unit that acquires a first look-up table for converting image data; a setting unit that sets a degree of application of the first look-up table acquired by the acquisition unit; and a generation unit that generates a second look-up table from the first look-up table based on the degree of application set by the setting unit, wherein image data obtained by the image capturing unit is converted using the second look-up table generated by the generation unit.

According to the present invention, in image processing with the look-up table, it is possible to obtain an image corrected so as to have an image quality preference of a user by changing the degree of application of the 3D-LUT using only a single LUT processing circuit.

Further features of the present invention will become apparent from the following description of exemplary embodiments with reference to the attached drawings.

BRIEF DESCRIPTION OF THE DRAWINGS

FIG. 5B is a diagram illustrating a part of the 3D-LUT data according to the first embodiment.

FIG. 5C is a diagram illustrating a part of the 3D-LUT data according to the first embodiment.

FIG. 8 is a flowchart depicting image conversion processing based on the 3D-LUT according to a fourth embodiment.

DESCRIPTION OF THE EMBODIMENTS

Figure 1:
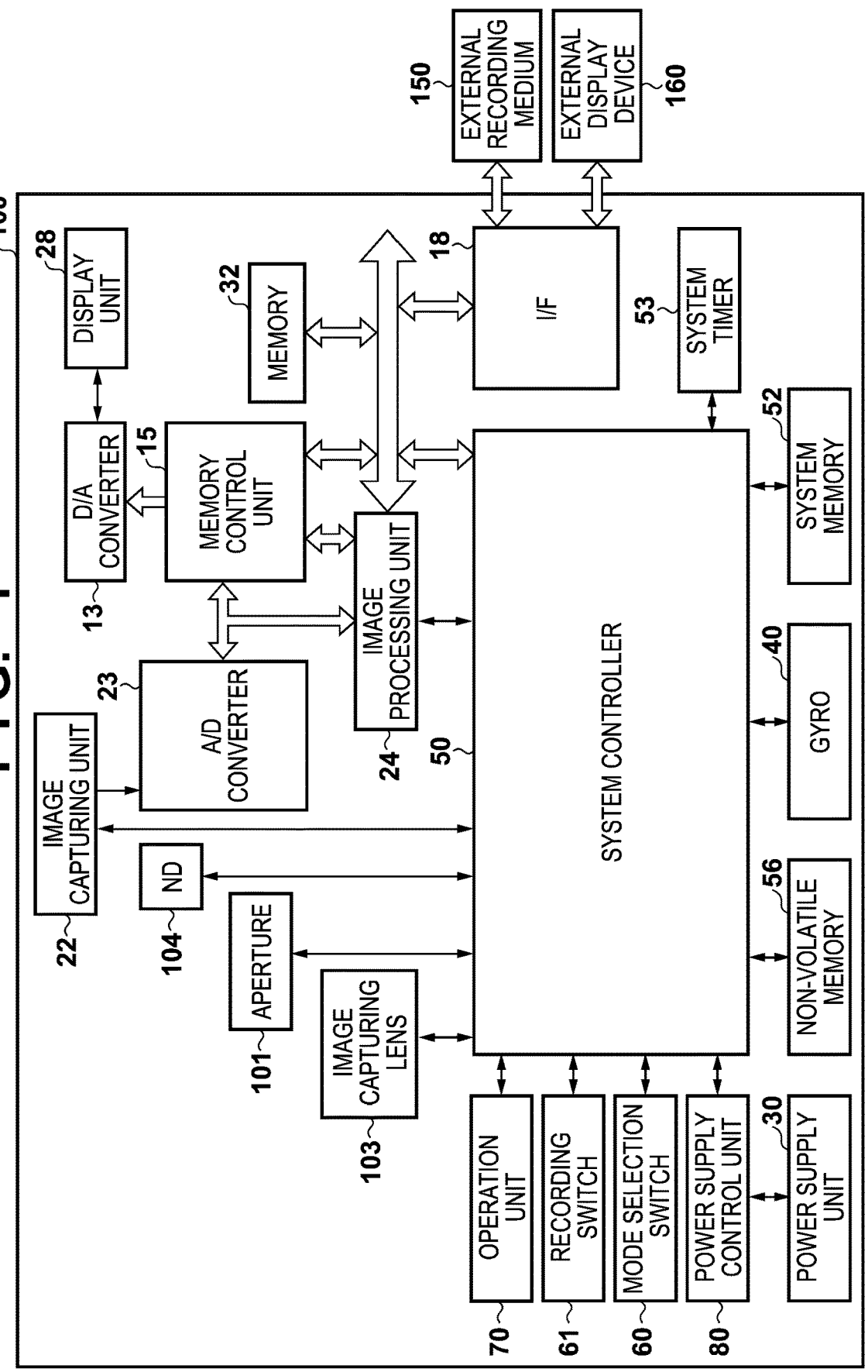
FIG. 1 is a block diagram illustrating an internal configuration of an image capturing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating an internal configuration of an image capturing apparatus 100 according to the first embodiment. In FIG. 1, an image capturing lens 103 is a lens group including a zoom lens, a focus lens, and a shift lens, and forms an optical image of a subject on an image capturing surface of an image capturing unit 22. An aperture 101 is an aperture used for adjusting an amount of light, and an ND 104 is a neutral density (ND) filter for reducing light. The image capturing unit 22 includes an image capturing element that converts an optical image formed on the image capturing surface of itself into an electric signal and includes, for instance, a CCD or a CMOS element. The image capturing unit 22 also has functions of, for instance, controlling accumulation by an electronic shutter, changing an analog gain, and changing a reading speed. An A/D converter 23 is used to convert an analog image signal output from the image capturing unit 22 into a digital signal.

Under the control by a system controller 50, an image processing unit 24 performs processing, such as predetermined pixel interpolation processing, resizing processing, such as reduction processing, detection processing of, for instance, luminance information, color information, or a characteristic subject, color conversion processing, gamma correction processing, and digital gain addition processing on digital image data (hereinafter simply referred to as image data) from the A/D converter 23 or data from a memory control unit 15. Examples of the image processing method include image processing by a dedicated calculation circuit and image processing by a 3D-LUT processing circuit. Additionally, the image processing unit 24 performs predetermined calculation processing using the image data obtained by capturing, and transmits the calculation result to the system controller 50. Based on the transmitted calculation result, the system controller 50 performs, for instance, exposure control, distance measurement control, and white balance control. Thus, for instance, autofocus (AF) processing, automatic exposure (AE) processing, and auto white balance (AWB) processing in through-the-lens (TTL) method are performed. In addition, the system controller 50 performs image shake correction by operating the shift lens of the image capturing lens 103 or shifting an image by the image processing unit 24 with respect to a movement or a posture change of the image capturing apparatus 100 due to, for instance, a camera shake detected by a gyro 40.

The image data from the A/D converter 23 is written in a memory 32 via the image processing unit 24 and the memory control unit 15 or written directly via the memory control unit 15. The memory 32 stores image data captured by the image capturing unit 22 and converted into digital data by the A/D converter 23, and image data displayed on a display unit 28. The memory 32 is also used to temporarily store an image that is image-processed by the image processing unit 24 and to return the image to the image processing unit 24 again, which then applies another image process. The memory 32 is provided with a sufficient storage capacity to store a predetermined time of moving images and voices. The memory 32 also serves as a memory for image display (video memory).

A D/A converter 13 converts data for image display stored in the memory 32 into an analog signal and supplies the analog signal to the display unit 28. The image data for display written to the memory 32 is displayed by the display unit 28 via the D/A converter 13. The display unit 28 performs display according to the analog signal from the D/A converter 13 on a display device, such as an LCD. A digital signal that has been A/D-converted by the A/D converter 23 and accumulated in the memory 32 is analog-converted by the D/A converter 13, and the signal is sequentially transferred to be displayed on the display unit 28. Thus, electronic viewfinder is achieved and through-image display can be performed.

A non-volatile memory 56 is an electrically erasable and recordable memory, and, for instance, an EEPROM is used. The non-volatile memory 56 stores programs executed by the system controller 50, and various parameters and constants for processing. Here, the program is for performing various flowcharts described later.

The system controller 50 is constituted by a CPU and controls the whole image capturing apparatus 100. By executing the programs stored in the non-volatile memory 56 described above, each processing according to the present embodiment described later is performed. A RAM is used as a system memory 52, and, for instance, a constant for operation of the system controller 50, a variable, and a program read from the non-volatile memory 56 are developed to the system memory 52. The system controller 50 also performs display control by controlling, for instance, the memory 32, the D/A converter 13, and the display unit 28.

A system timer 53 is a clock unit that measures a time used for various controls and a time of a built-in clock. A mode selection switch 60, a recording switch 61, and an operation unit 70 are operation means for inputting various operation instructions from the user to the system controller 50.

The mode selection switch 60 switches an operation mode of the system controller 50 to any of, for instance, a moving-image recording mode, a still image recording mode, and a playback mode. Examples of modes included in the moving-image recording mode and the still image recording mode include an auto mode, an auto scene determination mode, a manual mode, various scene modes becoming shooting settings depending on shooting scenes, a program AE mode, and a custom mode. Operating the mode selection switch 60 allows directly switching to any of these modes included in the moving image shooting mode. Alternatively, after the mode is once switched to the moving image shooting mode by the mode selection switch 60, the mode may be switched to any of these modes included in the moving image shooting mode using another operation member. The recording switch 61 switches a state between a shooting standby state and a shooting state. When the recording switch 61 is turned on, the system controller 50 starts a series of operations from reading a signal from the image capturing unit 22 to writing moving image data to an external recording medium 150.

By selecting and operating various function icons displayed on the display unit 28, functions are appropriately assigned for respective operation members of the operation unit 70 for each scene, and the operation members operate as various function buttons. Examples of the function buttons include, an end button, a return button, an image feeding button, a jump button, a narrow-down button, and an attribute change button. For instance, when a menu button is pressed, a menu screen on which various settings can be performed is displayed on the display unit 28. The user can intuitively perform various settings by using the menu screen, arrow keys in four directions of up, down, right, and left, and a SET button displayed on the display unit 28.

A power supply control unit 80 includes, for instance, a battery detection circuit, a DC-DC converter, and a switch circuit for switching a block to be energized, and detects whether a battery is mounted, the type of the battery, and a remaining battery level. The power supply control unit 80 controls the DC-DC converter based on the detection result and an instruction from the system controller 50, and supplies a required voltage to each unit including the external recording medium 150 for a required period.

A power supply unit 30 includes primary batteries, such as an alkaline battery and a lithium battery, secondary batteries, such as a NiCd battery, a NiMH battery, and a Li ion battery, and an AC adapter. An I/F 18 is an interface with the external recording medium 150, such as a memory card and a hard disk, and an external display device 160. The external recording medium 150 is a recording medium, such as a memory card, for recording a shot image and exchanging data with the outside, and, for instance, a semiconductor memory is used as the external recording medium 150.

In the present embodiment, a description will be given of an operation in a case where the image capturing apparatus 100 retrieves a 3D-LUT generated by an external application operating on an information processing apparatus represented by, for instance, a PC and a tablet and converts an image. Therefore, it is assumed that the user stores the 3D-LUT generated by the application operating on the information processing apparatus owned by the user as a file in the external recording medium 150.

First, the user inserts (connects) the external recording medium 150 storing the 3D-LUT file into a slot (not illustrated) of the image capturing apparatus 100. Then, the user operates the operation unit 70 to input a retrieving operation of the 3D-LUT. Upon receiving this operation, the system controller 50 once stores character strings described in the 3D-LUT file acquired via the I/F 18 in the system memory 52, and analyzes the character strings. The system controller 50 converts the character string into a numerical value, generates 3D-LUT data in a data format that can be handled by the image processing unit 24, and records it in the system memory 52 or the non-volatile memory 56. Thereafter, the generated 3D-LUT data is converted into an image by a 3D-LUT processing unit of the image processing unit 24, thereby allowing obtaining a target image. Although the description is given on the assumption that the 3D-LUT data is described in character strings in the 3D-LUT file in the present embodiment, but the 3D-LUT data may be described in a binary format or other formats. Although the external recording medium 150 storing the 3D-LUT file is connected to the image capturing apparatus 100 in the above example, for instance, the image capturing apparatus 100 and the information processing apparatus may be directly connected via the I/F 18 and the image capturing apparatus 100 may download the 3D-LUT from the information processing apparatus.

Next, with reference to FIG. 2, an example of a flow of general processing performed in post-production when a degree of application of the 3D-LUT is changed will be described. Although an application often used in post-production has a function of converting an image based on the 3D-LUT, a contrivance is required to change the degree of application of the 3D-LUT.

First, various image processing 202 is applied to an input image 201. This is image processing excluding the 3D-LUT whose degree of application is desired to be changed, and includes many processes, such as tone and color correction. In this example, the processing is performed on the input image 201, but the processing may be performed after image composition described later or need not to be performed. Next, the processing is branched, and the image is converted by 3D-LUT processing 203 only in one side. After that, the image output from the 3D-LUT processing 203 and the other branched image are combined by image composition processing 204 to obtain an output image 205. The degree of application of the 3D-LUT can be adjusted by changing a composition ratio based on the degree of application. In the example of FIG. 2, the degree of application is 80%.

Figure 2:
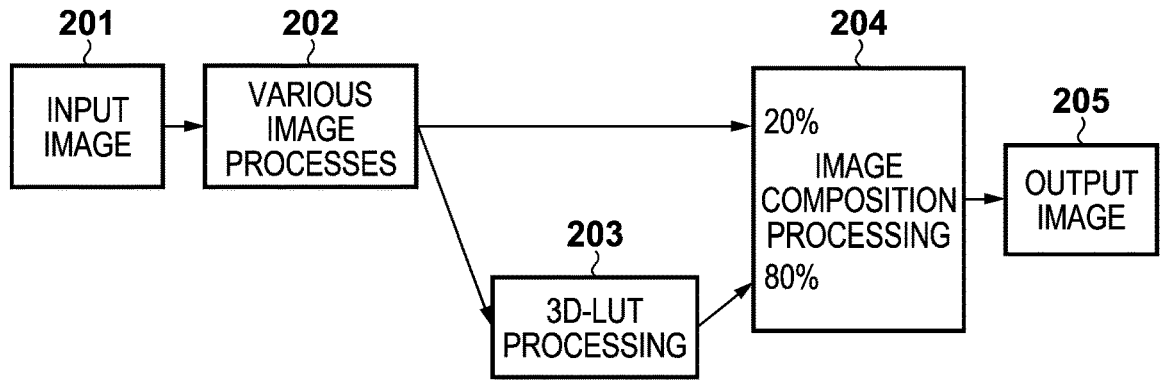
FIG. 2 is a diagram illustrating a flow of post-production processing according to a first embodiment.
Figure 3A:
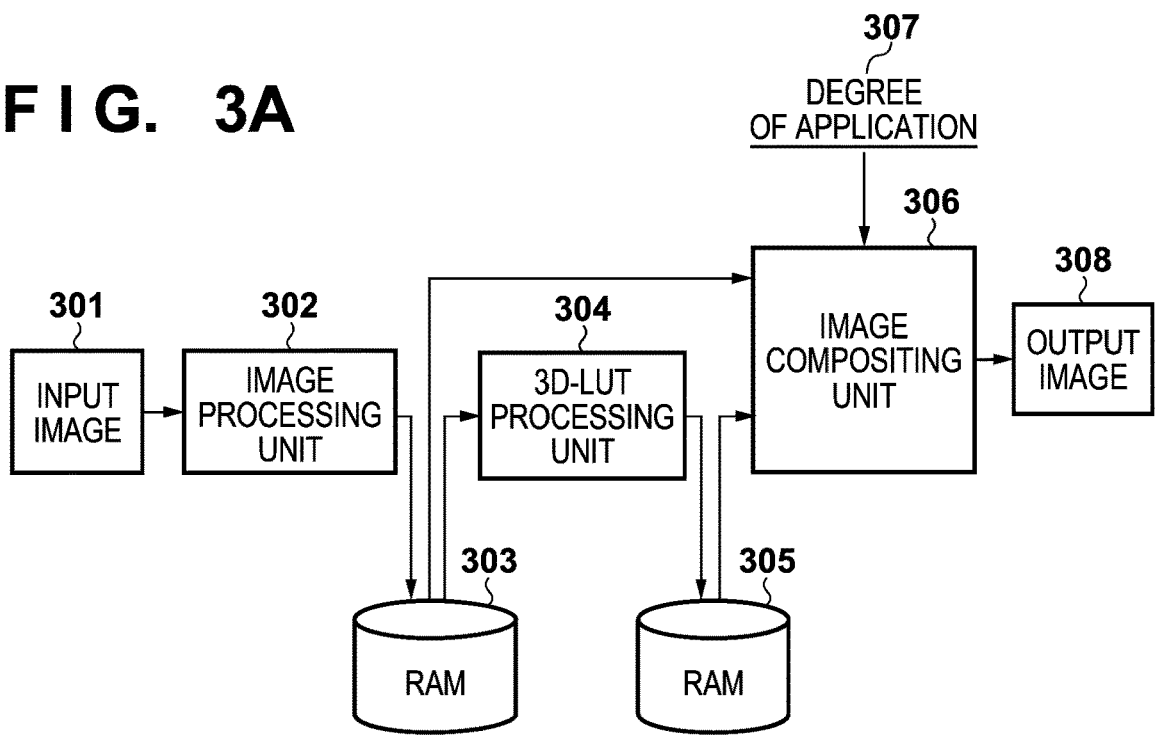
FIGS. 3A and 3B are diagrams illustrating flows of processing of image processing blocks of the image capturing apparatus according to the first embodiment.

When the processing in post-production described with reference to FIG. 2 is performed by the image capturing apparatus 100, the image processing unit 24 is supposed to have a configuration of a processing block as illustrated in FIG. 3A. First, image processing prior to the 3D-LUT processing is performed on an input image 301 by an image processing unit 302, and the input image 301 is recorded once in a RAM 303. Next, the image read out from the RAM 303 is converted based on the 3D-LUT by a 3D-LUT processing unit 304 and is recorded in a RAM 305. Thereafter, the images recorded in the RAM 303 and the RAM 305 are input to an image compositing unit 306, and image composition is performed here at a ratio based on a degree of application 307 set in the menu by the operation unit 70, and the combined image is output as an output image 308. Note that although image processing is performed in the image processing unit 302 and then image composition is performed in the image compositing unit 306 here, image processing in the image processing unit 302 may be performed after the image composition, or no processing may be performed in the image processing unit 302. Although the RAM 303 and the RAM 305 are expressed as different RAMs here, they may be different areas in the same RAM.

The present embodiment features that the processing performed in the block denoted by reference numerals 303 to 306 in FIG. 3A generates data as one 3D-LUT to simplify the processing block. A generation method of the 3D-LUT data in consideration of the degree of application in this case will be described later.

Figure 3B:
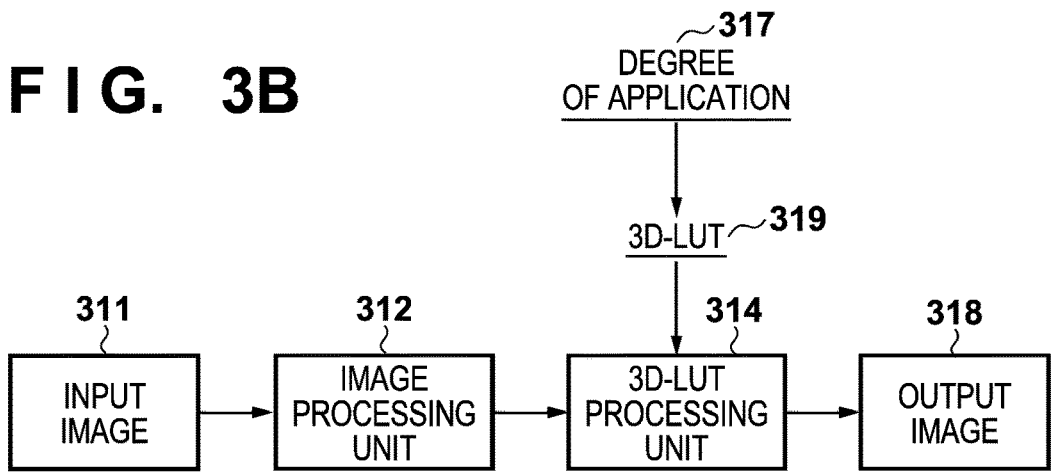

FIG. 3B illustrates a block diagram of the image processing unit 24 according to the present embodiment. First, an image processing unit 312 performs image processing before 3D-LUT processing on an input image 311. After that, a 3D-LUT processing unit 314 converts the image based on a 3D-LUT 319 generated in consideration of a degree of application 317 to generate an output image 318.

Figures 4, 5A:
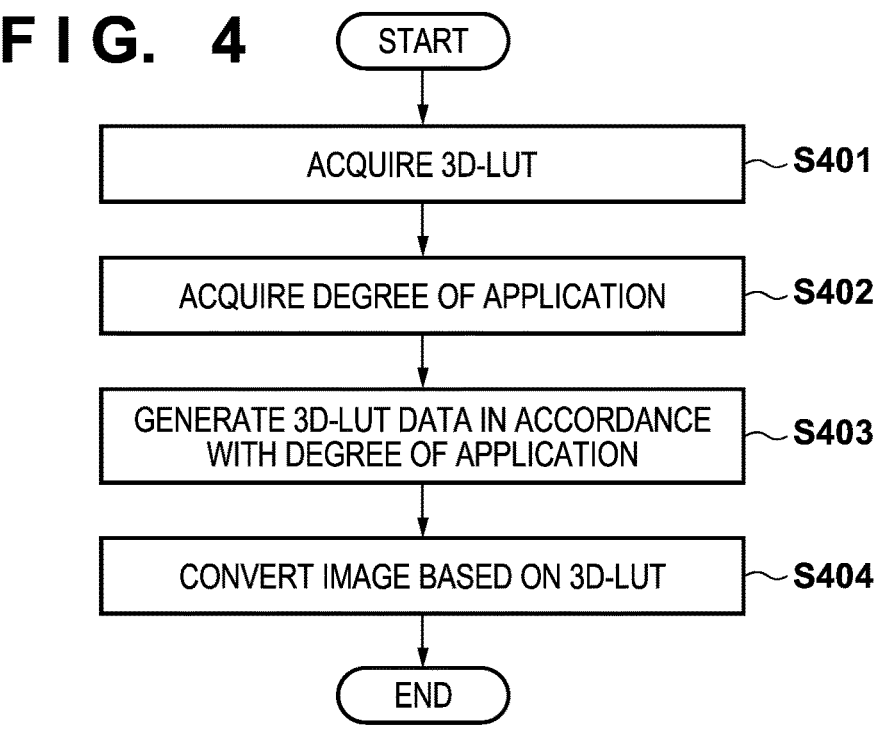
FIG. 4 is a flowchart depicting image conversion processing according to the first embodiment.
FIG. 5A is a diagram illustrating a part of 3D-LUT data according to the first embodiment.

FIG. 4 depicts a flowchart expressing a flow of processing of the system controller 50 according to the present embodiment.

First, in S401, the system controller 50 acquires 3D-LUT data. Next, in S402, the system controller 50 acquires the degree of application set by the operation from the operation unit 70 by the user via the menu. Thereafter, in S403, the system controller 50 corrects the data constituting the 3D-LUT on the 3D-LUT data acquired in S401 based on the degree of application acquired in S402 and generates the 3D-LUT data in consideration of the degree of application. The generation method of 3D-LUT data in consideration of the degree of application will be described later. Finally, in S404, the system controller 50 sets the generated 3D-LUT in the image processing unit 24, and causes the image processing unit 24 to convert the image data. Accordingly, an image on which a suitable image quality effect is provided can be acquired.

Next, the generation method of 3D-LUT data in consideration of the degree of application will be described.

In the present embodiment, since the effect is too strong in the image obtained by converting the image based on the 3D-LUT aiming at image quality effect, a case in which the user inputs an instruction to suppress the degree of application of the 3D-LUT to 80% via the operation unit 70 will be described.

First, FIG. 5A illustrates a part of 3D-LUT (hereinafter also referred to as an image quality effect LUT) data generated by an external application and retrieved to the image capturing apparatus 100. Here, while a LUT that is 17 Grid 3D-LUT for an RGB signal incremented from an R-component is used an example, it may be a LUT for a signal other than RGB or the arrangement of the data may be different. In the embodiment, each of the RGB values is represented as 0 to 1 (decimal point).

To reproduce a state in which images on which conversion based on the 3D-LUT is performed and images for which the 3D-LUT is not used are combined at a ratio of 80:20 with one 3D-LUT, the system controller 50 prepares a 3D-LUT in which input is equal to output (hereinafter a through look-up table or a through LUT). Since the through LUT has a relationship of input and output equal to the input, it can be easily generated. FIG. 5B illustrates a part of the through LUT data. Then, the system controller 50 calculates each piece of data constituting the image quality effect LUT and the through LUT by the equation (1) shown in the following formula (1) to combine the data at the ratio of 80:20 and generates a composite LUT.

$$\text{Composite LUT}=(\text{image quality effect LUT data})\times 0.8+(\text{through LUT data})\times 0.2 \quad (1)$$

For instance, in the case of 17-Grid 3D-LUT, performing calculation of the equation (1) on 14739, which is equal to 17×17×17×3, pieces of data can generate the composite LUT combined at the ratio of 80:20. FIG. 5C illustrates an example of the composite LUT generated by the system controller 50. In the embodiment, a grid interval is compensated by, for instance, linear interpolation processing.

The system controller 50 sets the composite LUT generated as described above in the image processing unit 24. As a result, the image processing unit 24 can perform image conversion equivalent to the 3D-LUT processing unit 314 in FIG. 3B, and can achieve a result equivalent to the image processing in the block illustrated in FIG. 3A with a simpler block as in FIG. 3B.

In the present embodiment, the operation in the case where the 3D-LUT generated by the external application is retrieved to the image capturing apparatus 100, the image quality effect by the 3D-LUT is corrected based on the degree of application, and then the image is converted has been described. However, the correction based on the degree of application may be performed on the 3D-LUT recorded in advance in the image capturing apparatus 100. In addition, correction based on the degree of application may be performed again on the 3D-LUT after correction based on the degree of application has been performed once. In this case, the degree of application may be expressed in consideration of correction of the degree of application of at the first stage, or the state after the correction at the first stage may be expressed as 100%.

Although the degree of application is expressed by the percentage in the present embodiment, the user may select abstract expression, such as large, medium, or small.

Second Embodiment

In the first embodiment, the method of generating the 3D-LUT data based on the degree of application designated by the user has been described, but it is difficult to estimate what degree of application will provide the favorite image quality for the user from the image converted based on the original image quality effect LUT. Therefore, in the present embodiment, a user interface effective for determining the degree of application will be described. The configuration of the image capturing apparatus according to the present embodiment is similar to that of the first embodiment (FIG. 1), and therefore the description thereof will be omitted.

While viewing the captured image displayed on the display unit 28 or the external display device 160, the user operates the operation unit 70 to set the value of the degree of application from the menu. Here, a case of displaying it on the display unit 28 will be described.

The system controller 50 generates the composite LUT based on the degree of application set in the menu and sets the composite LUT in the image processing unit 24. Then, the image processing unit 24 displays the image converted with the composite LUT on the display unit 28. Then, while viewing the image obtained by the conversion, the user operates the operation unit 70 to adjust the composition ratio (degree of application) according to his/her preference. Hereinafter, this processing is repeated until the image desired by the user is displayed.

However, the more appropriate degree of application can be determined by comparison with the image before conversion based on the 3D-LUT and the image with the degree of application of 100%, rather than determination of the degree of application using only the image after correction.

Figure 6:
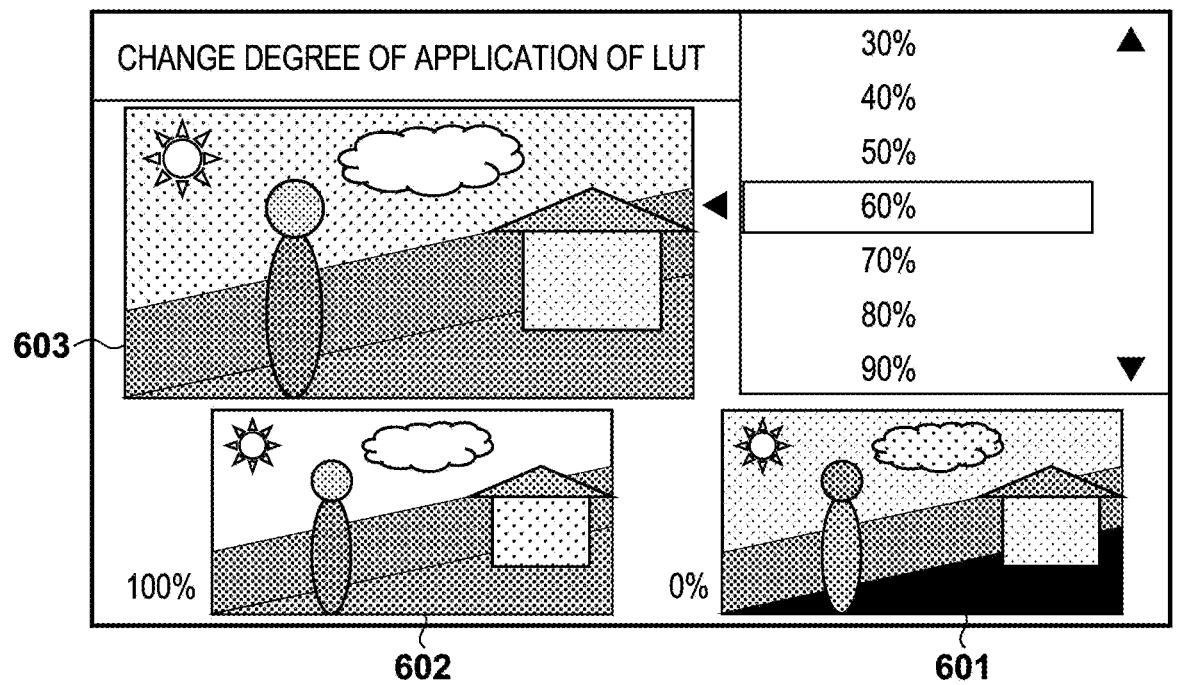
FIG. 6 is a diagram illustrating an example of a display according to a second embodiment.

Therefore, in the present embodiment, as illustrated in FIG. 6, the region of the captured image displayed on the display unit 28 is divided into three, and an image 601 not converted with the 3D-LUT, an image 602 converted based on the 3D-LUT, and an image 603 converted based on the 3D-LUT that has been corrected based on the degree of application are displayed in the respective regions. Thus, the user can easily determine at what degree of application the optimal image quality effect can be achieved. In the case of FIG. 6, the user can freely set the degree of application by scrolling a window for setting the degree of application at the upper right of the screen up and down by operating the operation unit 70. Every time the degree of application is changed by the user, the system controller 50 generates the 3D-LUT based on the degree of application, sets it in the image processing unit 24, and converts the captured image. Then, the system controller 50 displays the image data obtained by the conversion as the image 603 (updates the image 603). Note that the image 602 and the image 603 may be displayed in two regions instead of providing the three regions for displaying the images.

To simultaneously generate a plurality of images having different conversion states with the 3D-LUT, it is necessary to hold the respective images obtained in the block diagram of FIG. 3A in the RAM and combine them in one screen. However, reducing a frame rate of each image and generating and combining a plurality of images in a time division manner allows implementing it in the simpler processing block illustrated in FIG. 3B. At this time, for instance, the frame rate of an image other than the image based on the degree of application may be decreased. Further, the image not converted with the 3D-LUT and the image converted based on the 3D-LUT may be images in which a part of them are trimmed, not the entire angle of view.

As another means, an image not converted with the 3D-LUT, an image converted based on the 3D-LUT, and an image converted based on the 3D-LUT corrected based on the degree of application may be switched and displayed in a time division manner, or an image not converted with the 3D-LUT or an image converted based on the 3D-LUT may be displayed only when the user instructs it. Additionally, based on the instruction from the user, recording is performed as a plurality of still images or continuous moving images while the degree of application is automatically changed at every predetermined period, such as one-second intervals, and the optimum degree of application may be found from the recorded content.

As a result, the user can compare the image quality effect of the 3D-LUT and determine the optimum degree of application.

Third Embodiment

In the first embodiment, the method of generating the 3D-LUT data by performing calculation using the equation (1) based on the degree of application designated by the user has been described. However, when respective components of color spaces handled in the 3D-LUT are calculated with the same degree of application, the image does not always become a favorite image for the user. Therefore, in the present third embodiment, a setting method of the degree of application and a generation method of 3D-LUT data with higher flexibility will be described. The configuration of the image capturing apparatus according to the present third embodiment is similar to that of the first embodiment, and therefore description thereof will be omitted.

Figure 7:
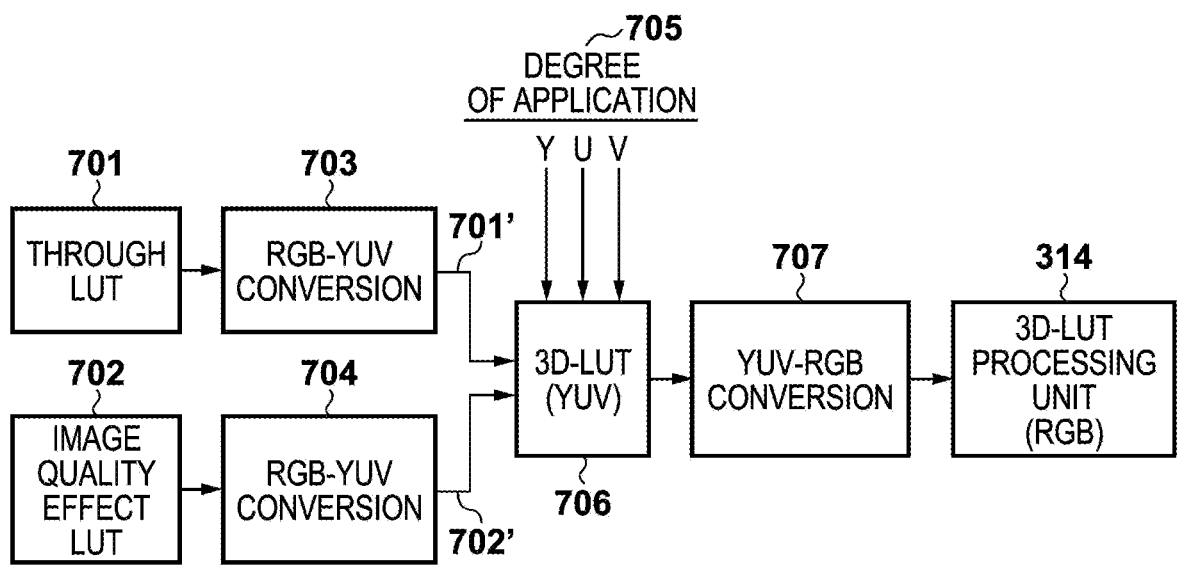
FIG. 7 is a diagram illustrating a flow of processing of a 3D-LUT data generation method of the image capturing apparatus according to a third embodiment.

Hereinafter, the 3D-LUT data generation method according to the present embodiment will be described with reference to the block diagram illustrated in FIG. 7 as an example. It should be understood that the respective components illustrated in the same drawing are set to the image processing unit 24 by the system controller 50.

First, the system controller 50 converts a through LUT 701 by an RGB-YUV conversion block 703 to generate a through LUT 701' for a YUV color space represented by one luminance (Y) and two color differences (U, V). Similarly, the system controller 50 converts an image quality effect LUT 702 by an RGB-YUV conversion block 704 to generate an image quality effect LUT data 702' for a YUV color space of one luminance (Y) and two color differences (U, V).

Then, the system controller 50 generates 3D-LUT data 706 for a YUV color space by combining the through LUT data 701' and the image quality effect LUT data 702' in accordance with the degree of application set independently for each of the luminance and the color differences by the user. Then, the system controller 50 converts the generated 3D-LUT data 706 for a YUV color space by a YUV-RGB conversion block 707 to generate 3D-LUT data for an RGB color space, and sets it in the image processing unit 24.

Hereinafter, a specific example of the generation method of 3D-LUT data in consideration of the degree of application that can be adjusted for each of the components of a YUV signal will be described. In the present embodiment, the signal of a luma component Y is assumed as an image obtained by conversion using 100% of the 3D-LUT aiming at the image quality effect. For signals of chroma components U, V, a case in which the degrees of application of the 3D-LUT are suppressed to be 80% and 50%, respectively, will be described as an example.

Each data constituting the through LUT 701' and the image quality effect LUT 702' is calculated by the equations indicated by the following (2) to (4) to generate a 3D-LUT 706 for a YUV color space.

Luma Component Y $$\text{Composite LUT} = (\text{image quality effect LUT data 702'}) \times 1.0 + (\text{through LUT data 701'}) \times 0.0 \quad (1)$$

Chroma Component U $$\text{Composite LUT} = (\text{image quality effect LUT data 702'}) \times 0.8 + (\text{through LUT data 701'}) \times 0.2 \quad (2)$$

Chroma Component V $$\text{Composite LUT} = (\text{image quality effect LUT data 702'}) \times 0.5 + (\text{through LUT data 701'}) \times 0.5 \quad (3)$$

As described above, by decomposing the data into the luma component and the chroma components and adjusting the degree of application for each of the components, it is possible to generate a 3D-LUT 706 finely adjusted to the image preference of the user. However, the generated 3D-LUT is for a YUV color space. Therefore, the system controller 50 converts the 3D-LUT 706 in the YUV-RGB conversion block to generate a 3D-LUT 319 for an RGB color space.

Although the case where the RGB signal is converted into the YUV signal and the degree of application is adjusted for each component has been described in the present embodiment, the degree of application may be adjusted for each component of the RGB signal without performing conversion. Further, it is not necessary to be limited to the conversion into the YUV signal, and each process can be similarly performed in another color space, for instance, an L*a*b* space and an ICtCp space.

Fourth Embodiment

In the first to third embodiments, the method in which the user freely sets the degree of application of the 3D-LUT has been described. However, in the case of the 3D-LUT as the color space conversion rather than the 3D-LUT as the image quality effect, since the aspect as format conversion is the main purpose, there is a case where it is not desirable that the user can freely set the degree of application. In addition, there is a case where a LUT creator does not want to change the degree of application as the intention of the LUT creator. Further, there is a case where it is desired to set a value smaller than 100% as the initial value of the degree of application to give room for changing the degree of application in a direction of increasing the degree of application. Therefore, in the present fourth embodiment, a method of reading information on whether the degree of application included in the 3D-LUT can be changed or not or is unrecommended, and the initial value of the degree of application, and performing an operation according to it will be described with reference to a flowchart of FIG. 8. Note that the information on whether the degree of application included in the 3D-LUT can be changed or not or is unrecommended, and the information on the initial value of the degree of application may be described by being attached to the main 3D-LUT data, such as a file header of the 3D-LUT file.

In S801, the system controller 50 reads the 3D-LUT file from the external recording medium 150 similarly to the first embodiment, and stores it in the system memory 52. At this time, like the lines staring from "#" in FIGS. 9A and 9B, to read the 3D-LUT including the information on the change in the degree of application and the information on the initial value of the degree of application, the information is also read together.

Figures 9A, 9B, 10:
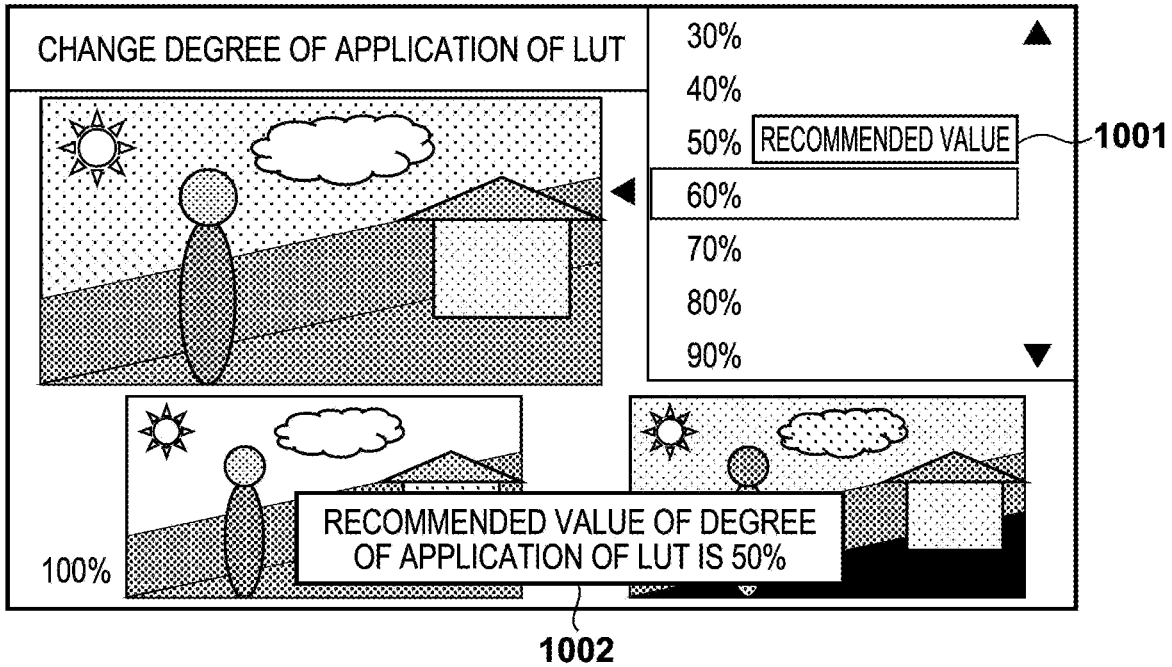
FIGS. 9A and 9B are diagrams illustrating an example of a 3D-LUT file according to the fourth embodiment.
FIG. 10 is a diagram illustrating an example of a display according to the fourth embodiment.

In S802, the system controller 50 determines whether the information on the initial value of the degree of application is included in the information read in S801. FIG. 9A illustrates the 3D-LUT not including the information on the initial value of the degree of application, and FIG. 9B illustrates the 3D-LUT including the information on the initial value of the degree of application. When the system controller 50 determines that the information on the initial value of the degree of application is not included, the system controller 50 advances the processing to S803. When the system controller 50 determines that it is included, the system controller 50 advances the processing to S804. Although an example in which the 3D-LUT is expressed by the character string is shown in the present embodiment, information on the numerical value data of the 3D-LUT and the change in the degree of application may be expressed in any format including a binary format.

In S803, since the system controller 50 determines that the 3D-LUT does not include the initial value of the degree of application in S802, the system controller 50 sets the degree of application 317 to 100%.

In S804, the system controller 50 sets the degree of application 317 to the degree of application read in S801.

In S805, the system controller 50 determines whether the information read in S801 includes information indicating that the degree of application is allowed to be changed or not or is not recommended. FIG. 9A illustrates the 3D-LUT file including the information indicating that the degree of application is not allowed to be changed, and FIG. 9B illustrates the 3D-LUT file including the information indicating that the change in the degree of application is unrecommended. The system controller 50 analyzes the 3D-LUT file and attempts to extract the information on the degree of application. Then, the system controller 50 advances the processing to S806 when the system controller 50 determines that the extracted information includes the information on the change in the degree of application or the degree of application being unrecommended, and advances the processing to S807 when the system controller 50 determines that the information includes the information on the change in the degree of application being not allowed. When the system controller 50 determines that the information is not included or the information indicating that the degree of application is allowed to be changed is included, the system controller 50 advances the processing to S808. Although an example in which the 3D-LUT is expressed by the character string is shown in the present embodiment, information on the numerical value data of the 3D-LUT and the change in the degree of application may be expressed in any format including a binary format.

In S806, when the user changes the degree of application through a user interface, the system controller 50 changes the user interface to a mode of displaying a warning, such as a warning 1002 in FIG. 10. The warning 1002 is displayed when the user sets a degree of application different from a recommended value. For instance, although the recommended value for the degree of application is 50%, when the user attempts to set 60% to the degree of application, the system controller 50 displays "The recommended value for the degree of application of the LUT is 50%". The warning may be displayed at the time of entering the user interface for changing the degree of application. Different from the warning 1002, information indicating the recommended value, such as a recommended value display 1001, may be displayed.

In S807, the system controller 50 locks the user interface for changing the degree of application such that the user cannot change the degree of application. Except for that, for instance, the user interface for changing the degree of application cannot be entered, or even when the user attempts to select a different degree of application, the degree of application may be disabled, and the degree of application may be returned to the original degree of application.

In S808, similarly to the first embodiment, the system controller 50 sets the 3D-LUT 319 generated in consideration of the degree of application 317 in the 3D-LUT processing unit 304. In this case, the degree of application 317 is the degree of application set in S803 or S804.

In the present embodiment, the method in which the information on the initial value of the degree of application read from the 3D-LUT, whether the degree of application is allowed to be changed or not, or not recommended is read and reflected to the degree of application 317 and the user interface has been described. According to the present embodiment, in the 3D-LUT in which the change in the degree of application is not desirable, it is possible to prohibit changing the degree of application or to notify the user of the change being not recommended. In addition, it is possible to set the initial value of the degree of application to a value lower than 100% (maximum value) to provide room for increasing the degree of application.

Note that, in the present embodiment, a pattern of whether the degree of application is allowed to be changed or not or unrecommended has been described, but it is also conceivable that the degree of application can be changed only for a user who satisfies a condition. For instance, a configuration in which while the degree of application is basically fixed for use, the user who has acquired a license can change the degree of application is considered.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-024918, filed Feb. 21, 2022, which is hereby incorporated by reference herein in its entirety.

What is claimed is:

1. An image capturing apparatus that includes an image capturing unit, comprising:
one or more memory devices that store a set of instructions; and
one or more processors that execute the set of instructions to:
acquire a first look-up table for converting image data;
set a degree of application of the acquired first look-up table based on a user operation; and
generate a second look-up table based on the first look-up table and the set degree of application,
wherein image data obtained by the image capturing unit is converted using the generated second look-up table,
wherein a conversion result based on the generated second look-up table varies, in accordance with the degree of application, between an unconverted image and an image converted using the first look-up table.

2. The apparatus according to claim 1, wherein the first look-up table is acquired from a predetermined memory included in the image capturing apparatus.

3. The apparatus according to claim 1, wherein the first look-up table is acquired from outside the image capturing apparatus.

4. The apparatus according to claim 1, further comprising a display unit that displays a first image obtained by the image capturing unit, a second image obtained by converting the first image with the first look-up table, and a third image obtained by converting the first image with the second look-up table in an arrangement,
wherein the setting unit reproduces the second look-up table by the generation unit every time the degree of application is changed, and
wherein the display unit displays the third image obtained by the conversion with the second look-up table generated every time the degree of application is changed in an arrangement with the first image and the second image.

5. The apparatus according to claim 1, further comprising:
a first conversion unit that converts a look-up table for an RGB color space into a look-up table for a color space having one luma component and two chroma components; and
a second conversion unit that converts the look-up table for the color space having the one luma component and the two chroma components into a look-up table for an RGB color space,
wherein the setting unit sets a degree of application to each of the luma component and the two chroma components, and
wherein the generation unit:
  converts each of a through look-up table for an RGB color space having a relationship of input and output equal to the input and a first look-up table for an RGB color space acquired by the acquisition unit by the first conversion unit;
  combines the luma components and the chroma components of the two look-up tables obtained by the conversion according to degrees of applications of the respective components to generate a look-up table having data of a luma component and two chroma components after the combination; and
  converts the generated look-up table by the second conversion unit to generate the second look-up table.

6. The apparatus according to claim 1, further comprising a determination unit that extracts information attached to the first look-up table acquired by the acquisition unit, and determines whether the extracted information includes information indicating whether a change in the degree of application is allowed and information on an initial value of the degree of application;
wherein the generation unit:
  generates the second look-up table in accordance with the initial value when a result of the determination by the determination unit indicates that the initial value of the degree of application is set;
  generates the second look-up table on an assumption that the degree of application is maximum when the result of the determination by the determination unit is determined that the initial value of the degree of application is not set;
  disables a setting of the degree of application by the setting unit when the result of the determination by the determination unit is determined that the change in the degree of application is not allowed; and
  generates the second look-up table in accordance with the setting of the degree of application by the setting unit when the result of the determination by the determination unit is determined that the change in the degree of application is allowed.

7. A method of controlling an image capturing apparatus that includes an image capturing unit, comprising:
acquiring a first look-up table for converting image data;
setting a degree of application of the first look-up table acquired in the acquiring, based on a user operation; and
generating a second look-up table based on the first look-up table and the degree of application set in the setting,
wherein image data obtained by the image capturing unit is converted using the second look-up table generated in the generating,
wherein a conversion result based on the generated second look-up table varies, in accordance with the degree of application, between an unconverted image and an image converted using the first look-up table.

8. A non-transitory computer-readable storage medium storing a program which, when read and executed by a computer, causes the computer to execute the steps of a method of controlling an image capturing apparatus that includes an image capturing unit, the method comprising:
acquiring a first look-up table for converting image data;
setting a degree of application of the first look-up table acquired in the acquiring, based on a user operation; and
generating a second look-up table based on the first look-up table and the degree of application set in the setting,
wherein image data obtained by the image capturing unit is converted using the second look-up table generated in the generating,
wherein a conversion result based on the generated second look-up table varies, in accordance with the degree of application, between an unconverted image and an image converted using the first look-up table.

9. The apparatus according to claim 1, wherein the second look-up table is generated by combining a through look-up table in which input is equal to output with the first look-up table.

* * * * *